United States Patent
Branover et al.

(10) Patent No.: US 8,112,648 B2
(45) Date of Patent: Feb. 7, 2012

(54) ENHANCED CONTROL OF CPU PARKING AND THREAD RESCHEDULING FOR MAXIMIZING THE BENEFITS OF LOW-POWER STATE

(75) Inventors: Alexander Branover, Chestnut Hill, MA (US); Maurice B. Steinman, Marlborough, MA (US); Denis Rystsov, Arlington, MA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 655 days.

(21) Appl. No.: 12/333,744

(22) Filed: Dec. 12, 2008

(65) Prior Publication Data

US 2009/0235260 A1 Sep. 17, 2009

Related U.S. Application Data

(63) Continuation-in-part of application No. 12/198,974, filed on Aug. 27, 2008, which is a continuation-in-part of application No. 12/045,764, filed on Mar. 11, 2008, now Pat. No. 8,028,185.

(51) Int. Cl.
  *G06F 1/26* (2006.01)
(52) U.S. Cl. ........................ 713/320; 718/100
(58) Field of Classification Search .......... 713/320–323; 718/100
  See application file for complete search history.

(56) References Cited

U.S. PATENT DOCUMENTS

| | | | |
|---|---|---|---|
| 5,740,417 A | 4/1998 | Kennedy et al. | |
| 6,510,525 B1 | 1/2003 | Nookala et al. | |
| 6,553,501 B1 | 4/2003 | Yokoe | |
| 6,954,864 B2 | 10/2005 | Schelling | |
| 6,988,214 B1 | 1/2006 | Verdun | |
| 7,111,182 B2 | 9/2006 | Gary | |
| 7,152,169 B2 | 12/2006 | Cooper et al. | |
| 7,159,766 B2 | 1/2007 | Wurzburg et al. | |
| 7,200,762 B2 | 4/2007 | Pearl | |
| 2006/0107262 A1 | 5/2006 | Bodas et al. | |
| 2009/0150696 A1 | 6/2009 | Song et al. | |
| 2009/0164814 A1 | 6/2009 | Axford et al. | |
| 2009/0249094 A1 | 10/2009 | Marshall et al. | |
| 2009/0320031 A1 | 12/2009 | Song | |

OTHER PUBLICATIONS

"Advanced Configuration and Power Interface Specification"; Hewlett-Packard Corporation, Intel Corporation, Microsoft Corporation, Phoenix Technologies Ltd., Toshiba Corporation; Oct. 10, 2006; 631 pages.

*Primary Examiner* — Clifford Knoll
(74) *Attorney, Agent, or Firm* — Meyertons Hood Kivlin Kowert & Goetzel, P.C.; Jeffrey C. Hood

(57) ABSTRACT

A system may comprise a plurality of processing units and a scheduler configured to maintain a record for each respective processing unit. Each respective record may comprise entries which may indicate 1) how long the respective processing unit has been residing in an idle state, 2) a present power-state in which the respective processing unit resides, and 3) whether the respective processing unit is a designated default (bootstrap) processing unit. The scheduler may select one or more of the plurality of processing units according to their respective records, and assign impending instructions to be executed on the selected one or more processing units. Where additional processing units are required, the scheduler may also insert an instruction to trigger an inter-processor interrupt to transition one or more processing units out of idle-state. The scheduler may then assign some impending instructions to these one or more processing units.

20 Claims, 9 Drawing Sheets

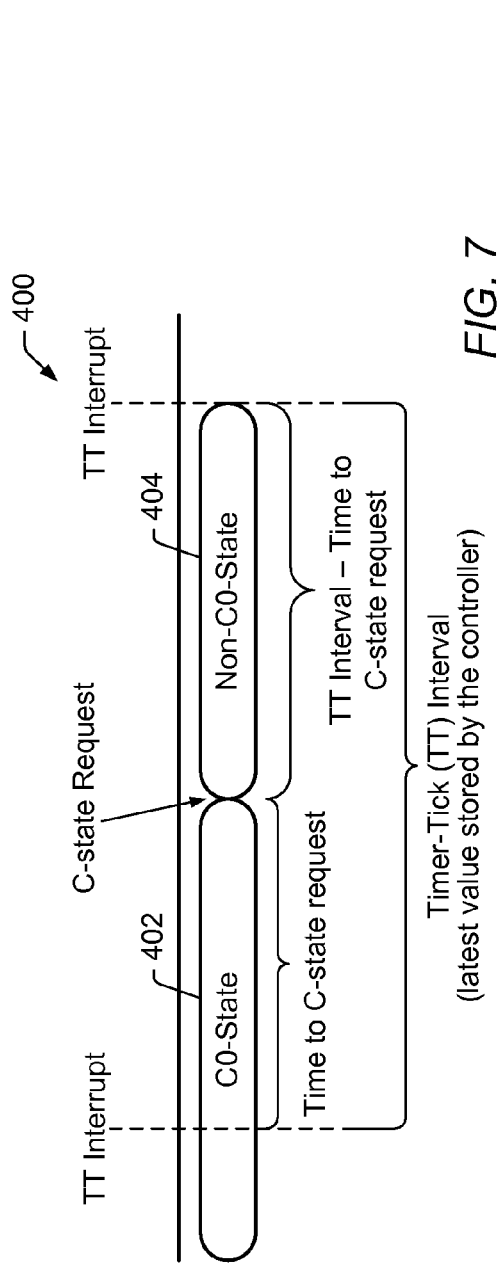
FIG. 7
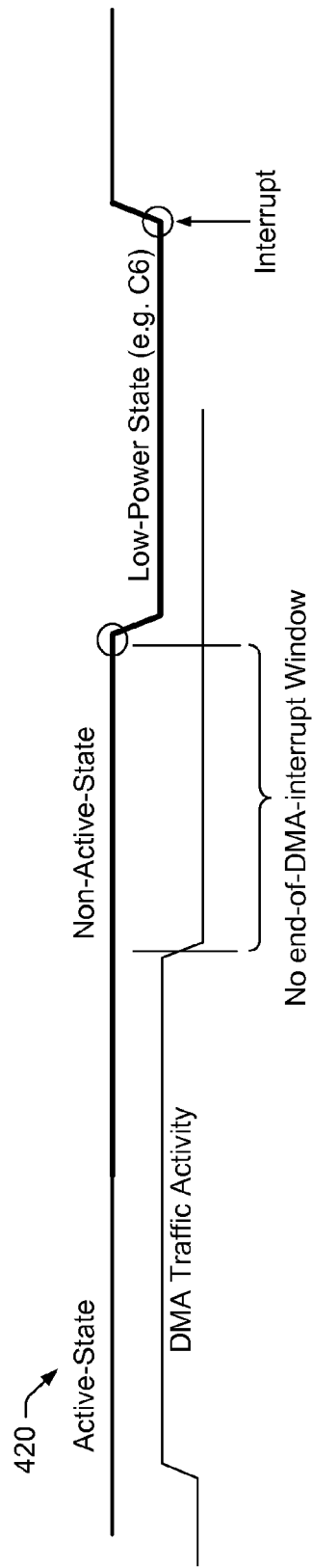
FIG. 8
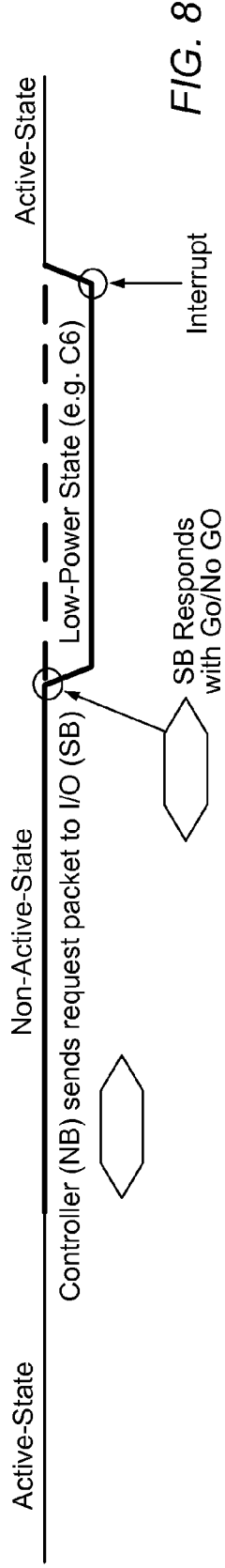

900

| Core | Parked |
|------|--------|
| 0 | Yes |
| 1 | Yes |
| 2 | No |
| 3 | No |

| Core # | Power-State (7 bits) | Idle Residency (μsec) | Bootstrap Core |
|--------|----------------------|------------------------|----------------|
| 0 | 00h (active) | 32 bits | 0 (No) |
| 1 | 05h | 32 bits | 1 (Yes) |
| 2 | 00h (active) | 32 bits | 0 (No) |
| 3 | 06h | 32 bits | 0 (No) |
| ... | ... | ... | ... |

*FIG. 10*

ENHANCED CONTROL OF CPU PARKING AND THREAD RESCHEDULING FOR MAXIMIZING THE BENEFITS OF LOW-POWER STATE

PRIORITY CLAIM

This application is a continuation-in-part of U.S. utility application Ser. No. 12/198,974 titled "Hardware Monitoring and Decision Making for Transitioning In and Out of Low-Power State" filed Aug. 27, 2008, whose inventors are Alexander Branover, Frank Helms, and Maurice Steinman, and which is hereby incorporated by reference in its entirety as though fully and completely set forth herein, which is a continuation-in-part of U.S. patent application Ser. No. 12/045,764 titled "Protocol for Transitioning In and Out of Zero-Power State" filed Mar. 11, 2008, now U.S. Pat. No. 8,028,185 whose inventors are Alexander Branover and Rajen S. Ramchandani, and which is hereby incorporated by reference in its entirety as though fully and completely set forth herein.

BACKGROUND OF THE INVENTION

1. Field of the Invention

This invention relates generally to the field of computer design and, more particularly, to the design of a protocol for thread rescheduling and parking processing units for maximizing the benefit gained from transitioning and holding processing units in a low-power state.

2. Description of the Related Art

The ever increasing advances in silicon process technology and reduction of transistor geometry makes static power (leakage) a more significant contributor in the power budget of processors (CPUs). Currently known CPU ACPI (Advanced Configuration and Power Interface) and ACPI-based low-power states (CI-C5) are very instrumental in eliminating dynamic power consumption and reducing the CPU static power. The ACPI is an open industry standard originally developed by Hewlett-Packard, Intel, Microsoft, Phoenix, and Toshiba, and defines common interfaces for hardware recognition, motherboard and device configuration and power management. The most widely recognized element of ACPI is power management, offering improvements over past power management methods by giving the Operating System (OS) control of power management, in contrast with prior power management models where power management control was mainly under the control of the BIOS, with limited intervention from the OS. In ACPI, the BIOS provides the OS with methods for directly controlling the low-level details of the hardware, providing the OS with nearly complete control over the power savings.

Another important feature of ACPI is bringing power management features previously only available in portable computers to desktop computers and servers. For example, systems may be put into extremely low consumption states, i.e., states in which only memory, or not even memory, is powered, but from which "general-purpose events" (GPEs, similar to interrupts, which can be sent by devices such as the real-time clock, keyboard, modem, etc.) can quickly wake the system. ACPI uses its own ACPI Machine Language (or AML) for implementing power event handlers, rather than the native assembly language of the host system, and while the AML code is typically part of firmware (BIOS) it is interpreted by the OS.

The ACPI specifies various groups of states, among them global states, device states, performance states, and processor states. For example, the ACPI standard defines four processor power states, C0-C3. C0 is the operating state. C1 (often referred to as Halt state) is a state in which the processor is not executing instructions, but can (essentially) instantaneously return to an executing state. Some processors also support an Enhanced C1 state (C1E) for lower power consumption. C2 (often known as Stop-Clock state) is a state in which the processor maintains all software-visible states at the expense of possibly taking longer to wake up. C3 (often known as Sleep state) is a state in which the processor does not need to keep its cache coherent, but does maintain other states. Some processors have variations on the C3 state (Deep Sleep, Deeper Sleep, etc.) that differ in how long it takes the processor to wake up. While the ACPI specifies 4 states (C0-C3), processors can have independently defined hardware states that range from C0 to C5 and beyond, as previously mentioned. A processor generally supports each of those C-states, which are typically mapped to a particular ACPI C-state depending on the behavior of the processor while in that state, as defined by ACPI. However, none of these states completely eliminates the static power component consumed by the processor. Therefore the efficiency of C1-C5 states for power saving is becoming more limited for advanced CPU manufacturing process technologies and smaller transistor geometries.

Various methods have been proposed and implemented to lower power consumption as much as possible. For example, power consumption may be lowered by sizing-down, invalidating, and eventually turning-off the L2 cache by lowering the retention voltage to a level lower than is needed to retain L2 contents. This is also known as the C5-state. While this offers one possible solution in eliminating the massive L2 component from the static power consumption budget, it does not eliminate the power consumption contribution of smaller arrays (e.g. L1 cache) or regular logic, thus maintaining static power at fairly high level for advanced (45 nm and lower) processes.

A new state, the C6 state, first introduced by Intel in 2007, allows for complete elimination of both dynamic and static components of power consumption, by transitioning the CPU to the zero-state where 0V is applied to the CPU voltage plane, and the CPU clock is completely turned off. It should be noted that the C6-state is not equivalent to system sleep state S3 where most of the system is powered down, and restoration to the C0-state requires an extended period of time, oftentimes in the range of many seconds. The C6-state can be applied to a single-core processor or to any core or group of cores in multi-core processors, while keeping other cores and system components (chipset, I/O, DRAM) in fully functional state. At the moment the OS indicates the need for allocating some task/process on a given CPU that is presently in the C6-state, that given CPU is powered-up and becomes available for executing the requested task/process. Generally, the C6-state provides enablement for a more aggressive performance-oriented approach to CPU process technology (for example reducing the transistor effective length), which would otherwise be impeded by the inevitable increase in static power consumption. Effectively managing a processor's transitioning in and out of the C6-state can therefore lead to improved power management and result in reduced overall power consumption.

Other corresponding issues related to the prior art will become apparent to one skilled in the art after comparing such prior art with the present invention as described herein.

SUMMARY OF THE INVENTION

In one set of embodiments, a method for scheduling tasks to execute on a plurality of processing units may include determining whether any of the plurality of processing units are available for executing scheduled tasks, and in response to determining that at least one processing units is available for executing the scheduled tasks, assigning the scheduled tasks to execute on the available processing unit(s). The method may further include determining whether additional processing units are required for executing the scheduled tasks, for example due to increased demand for parallelism of the scheduled tasks, and if additional processing units are required, executing an instruction to trigger an inter-processor interrupt to wake up selected one or more processing units of the heretofore unavailable processing units. The scheduled tasks may then also be assigned to execute on the selected one or more of the remaining ones of the plurality of processing units.

In one set of embodiments, a system may comprise a plurality of processing units configured to execute computer instructions, and a scheduler configured to maintain a table for tracking and managing idle-state residency of each respective processing unit of the plurality of processing units. The table may include a respective first entry for each respective processing unit indicating how long the respective processing unit has been residing in an idle state, a respective second entry for each respective processing unit indicating the power-state in which the respective processing unit presently resides, and a respective third entry for each respective processing unit indicating whether the respective processing unit is a designated default (bootstrap) processing unit. The scheduler may check the table to identify which of the plurality of processing units do not presently reside in an idle state, and are therefore available for executing impending instructions, and assign at least a first portion of the impending instructions to execute on one or more processing units identified as not being in an idle state. The scheduler may also check the table to identify bootstrap processing units, and transition the bootstrap processing units out of idle state first, when none of the plurality of processing units have been identified as being available for executing the impending instructions.

In one set of embodiments, the scheduler may determine whether additional processing units are required for executing the impending instructions, in addition to the one or more processing units identified as not being in an idle state, and if additional processing units are required, insert an instruction into the executing first portion of the impending instructions to trigger an inter-processor interrupt to transition selected processing units identified as being in an idle state, out of idle state. Subsequently, the scheduler may update the respective first and second entries for the selected processing units to reflect that the selected processing units are no longer in an idle state, and to indicate a respective present power-state of each of the selected processing units. In some embodiments, the scheduler may be part of an operating system executing on the system, or it may be part of any designated high-level software program executing on the system. In other embodiments, the scheduler may be implemented in hardware (HW), either as a dedicated HW module or as part of another HW module, with the dedicated HW module or specified part of another module configured for scheduling tasks on the plurality of processing units. For example, the scheduler may be configured as an individual hardware module, or it may be configured in one or more system hardware components having a primary function different from the scheduler.

A method for tracking and managing idle-state residency of each respective processing unit of a plurality of processing units, which may be processing cores on a processor, may include maintaining a respective record for each respective processing unit, wherein each respective record comprises first information indicative of a present power-state in which the respective processing unit resides, second information indicative of whether the respective processing unit resides in an idle state, and third information indicative of whether the respective processing unit is specified as a default (bootstrap) processing unit. The method may further include selecting one or more processing units of the plurality of processing units according to the respective records, and assigning impending instructions to execute on the selected one or more processing units. In selecting the one or more processing units, the second information in the respective records may be checked to determine whether any of the plurality of processing units are not residing in an idle-state, and are therefore available to execute the impeding instructions, and the one or more processing units may be selected from the processing units that have been determined as not residing in an idle state.

The method may further include determining whether additional processing units—in addition to the already selected one or more processing units—are required for executing the impending instructions. If it is determined that additional processing units are required, an instruction may be inserted into the already executing impending instructions to trigger an inter-processor interrupt, which may result in transitioning one or more processing units presently residing in an idle state, out of idle-state. At least a portion of the impending instructions may subsequently be assigned to execute on the one or more processing units transitioned out of idle state. The respective records may then be updated to reflect a present power-state and idle-state residency of the plurality of processing units. The above described method may be preferable in embodiments where the processing units are assumed to be homogenous, i.e., identical or similar enough to be considered identical. In embodiments where the processing units are heterogeneous, i.e. non-identical or not similar enough to be considered identical, additional system level information may be used to decide which of the processing units may be woken up, depending on the impending workload to be executed.

BRIEF DESCRIPTION OF THE DRAWINGS

Other aspects of the invention will become apparent upon reading the following detailed description and upon reference to the accompanying drawings in which:

FIG. 7 is a timing/state diagram of one embodiment of a protocol for predicting timer tick interrupts;

FIG. 8 is a timing/state diagram of one embodiment of a protocol for predicting I/O based and end-of-DMA interrupts FIG. 9 shows one embodiment of a simple parking table for tracking parking status of processing units;

FIG. 10 shows one embodiment of a parking table for tracking power-state, idle residency, and bootstrap designation of processing units.

Figure 1:
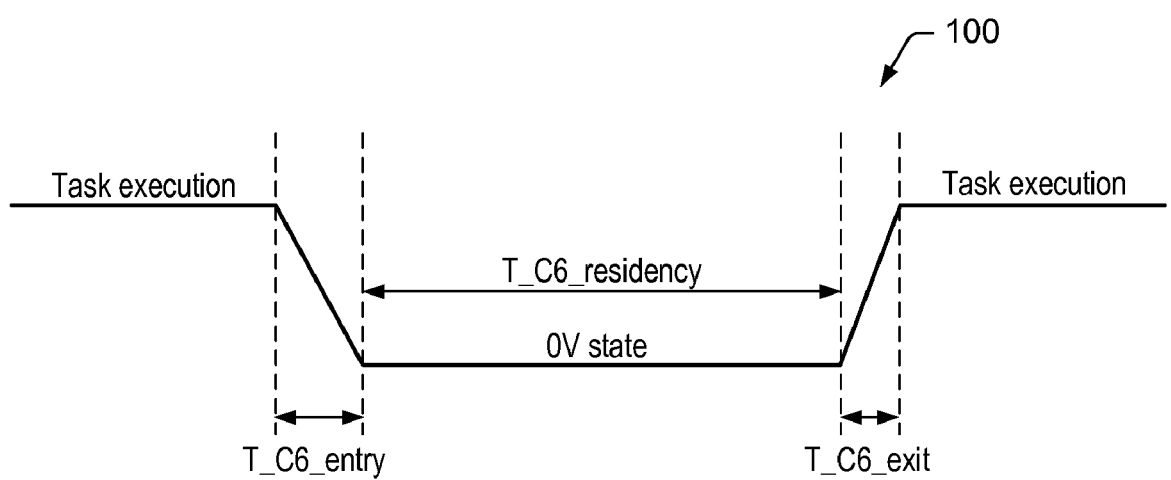
FIG. 1 shows a conceptual diagram of transitioning between an operating state and C6-state (0V-state), to illustrate C6-state residency trade-off between transition times and power.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

A zero-power or zero-volt (0V) state, otherwise referred to as C6-state may allow for complete elimination of both dynamic and static components of power consumption, by transitioning a processor core (or multiple processor cores) to a state in which the respective supply voltage of the processor core may be reduced to 0V, and the operating clock used by the processor core may be uncoupled from the processor core, or gated off from the processor core, meaning simply that the clock signal may be prevented from reaching the processor core. Alternately, the operating clock used by the processor may be completely turned off, e.g. when no other system components depend on the same clock. C6-state is not equivalent to system sleep, e.g. state S3 where most of the system is powered down, and restoration to the operating state (C0-state) may require an extended period of time, oftentimes many seconds. C6-state may be applied to a single-core processor or to any core or group of cores in multi-core processors, while keeping other cores and system components (e.g. chipset, I/O, DRAM) in a fully functional state. Similarly, C6-state may be applied to single-core microcontrollers or to any core or group of cores in multi-core microcontrollers, while keeping other cores and system components in a fully functional state. In general, transitioning in and out of C6-state as set forth and disclosed herein is not meant to be limited to processors and microcontrollers, and may equally be applicable to other similar circuits and/or processing units configured in various systems, for example digital signal processing units, graphics processing units, etc.

When the Operating System (OS) or a high-level program indicates the need for allocating certain tasks/processes to execute on a processor core that is currently in C6-state, the processor core may be powered-up and may become available for executing the requested tasks/processes. Generally, the C6-state may provide enablement for a more aggressive performance-oriented approach to processor fabrication process technology—for example, reducing the effective transistor channel-length—which would otherwise be impeded by the inevitable increase in static power consumption. In one set of embodiments, a protocol between microcode executing on a processor core configured within a processor, and a first circuit (or control circuit or controller, such as a North Bridge controller for example), also configured within the processor may be used for transitioning the processor core to C6-state. In general, the protocol may be used for effectively transitioning any one or more processor cores in and out of C6-state. By performing transition to low power states, e.g. to C6-state, without requiring any control signals from outside the processor, for example from a South Bridge, a more efficient and less complicated transition to a low-power state, or zero-power state may be achieved. In effect, a single chip processor, that is, a processor implemented as an integrated circuit (IC) may conduct transition of one or more of its cores to a low-power state based on an interrupt signal generated by circuitry on the processor die itself.

In one set of embodiments, either OS or HW-based inference logic tracking a processor's (CPU's) idle state may request the core (or any one or more of all the cores) of the processor to transition into C6 (0V) state. As used herein, C6-state refers to a zero-power state, which may itself refer to a zero-volt (0V) state. In certain embodiments, a zero-power state may be defined as a lowest-voltage state that is not exactly 0V, based on the particular requirements of any given system. Those skilled in the art will appreciate that zero-power state is not necessarily limited to 0V, and the protocol described herein may be used for transitioning to a zero-power state independently of the value of the actual voltage level associated with the zero-power level. In one set of embodiments, transitioning to C6-state may include the following steps:

(1) Storing (flushing) the updated contents of the processor caching system (e.g. L1, L2, L3, etc.) to the main (system) memory.

(2) Saving the architectural and system state in some powered-on storage.

(3) Turning down the processor clocking system.

(4) Reducing the supply voltage (powering the processor core) to 0V.

The architectural and system state may need to be saved in order to correctly and deterministically resume execution of the instruction stream when the processor core is transitioned back into the operational (C0) state. The architectural and system state may be saved either in external memory (e.g. system memory, DRAM) or in some on-die storage capacity that is not powered down in C6-state, and would therefore be configured outside of the processor core being placed in the C6-state. A processor core residing in C6-state may transition back to the operational state (C0) when one or more tasks need to be allocated to the processor core for execution. This may be requested via an interrupt signal or message. Transition from C6-state to C0-state may include the following steps:

(1) Restoring the supply voltage level of the processor core to operational level.

(2) Relocking the PLL.

(3) Resetting the processor core's internal state.

(4) Restoring the processor core's architectural and system state by reading the saved state from the external memory or on-die storage capacity where it was stored during transitioning to C6-state.

It should be noted that while one or more processor cores of a multi-core processor are in C6-state, other cores may remain in a fully operational state, executing tasks. If I/O devices send coherent probes while a processor core is in C6-state, the processor core's caching system may not need to be snooped, since its dirty (modified) contents would have been saved in main memory during the transition to C6-state.

One of the factors that may help achieve maximum power savings when placing a processor core (or multiple processor cores) is in C6-state is decreasing C6-state entry and exit times, while maximally lowering power consumption during those C6-state entry and exit times. Another key factor may be increasing C6-state residency. FIG. 1 provides a conceptual overview of the trade-off between transitioning into C6-state and C6-state residency. As shown in diagram 100, the overall time T (for C6-state entry, residency and exit) may be a sum of T_C6_entry+T_C6_residency+T_C6_exit. The overall power consumption P_C6 while in C6-state may then be calculated as $$P\_C6=P\_entry*(T\_C6\_entry/T)+P\_exit*(T\_C6\_exit/T). \quad (1)$$

This implies that in order to keep P_C6 as close to 0W as possible, the entry and exit times may need to be significantly lower than T_C6-residency. Another requirement may be to keep P_entry and P_exit lower than a specified threshold value. This may be implemented as a part of the C6-state entry/exit configuration, whereby the process of transitioning in and out of C6-state takes place in the operational state of the processor core characterized by the lowest power consumption. Additional requirements may include keeping the zero-power voltage configurable. As also previously indicated, the zero-power voltage may be defined higher than 0V (e.g. 0.2V~0.4V) trading off between low leakage and faster transition time (the higher the zero-power voltage, the shorter the transition time from operational state (C0) to C6-state.

Protocol between Microcode and NB Controller

Figure 2:
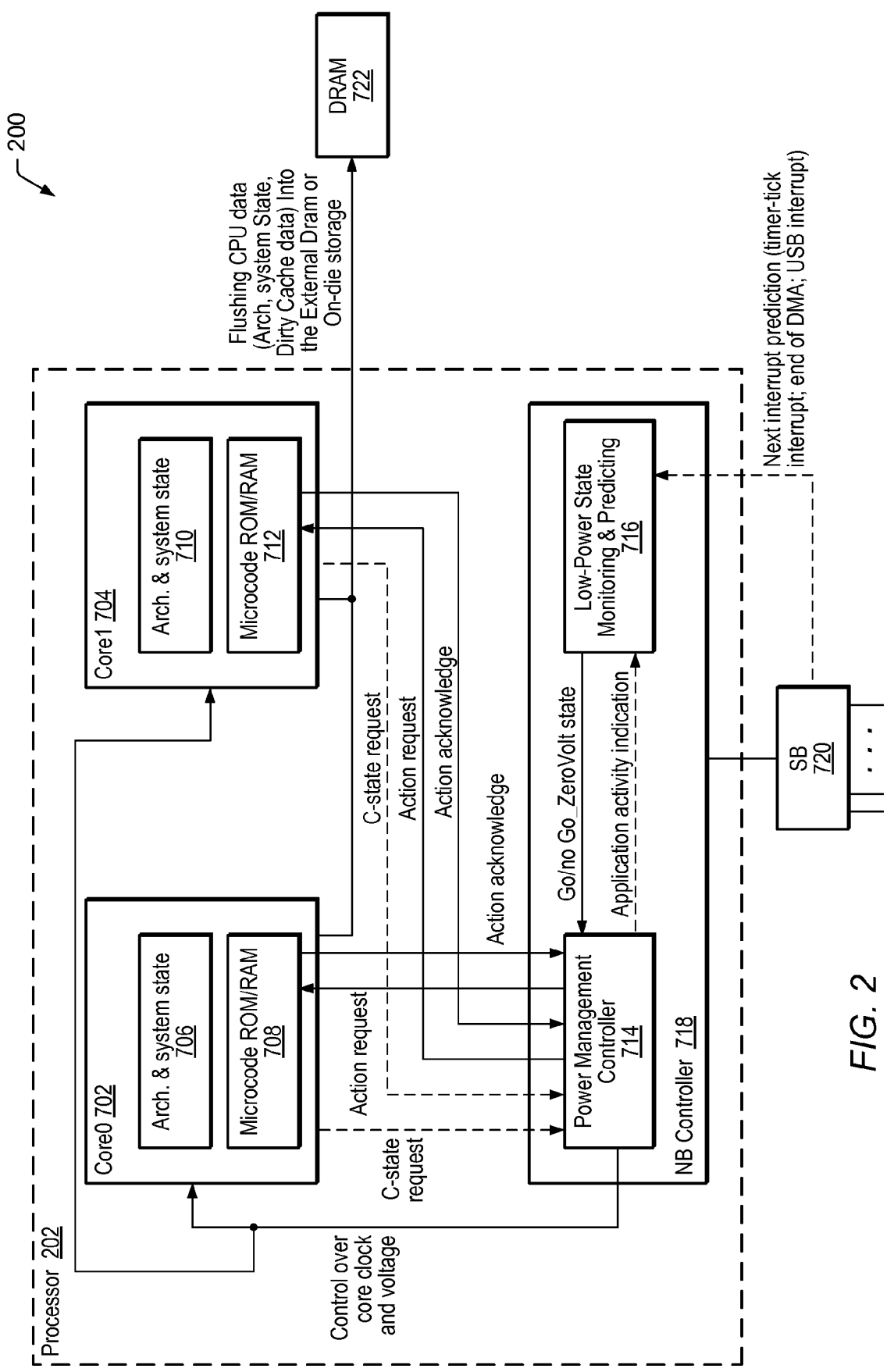
FIG. 2 is a partial logic block diagram of one embodiment of a computer system that includes a processor comprising one or more cores configured to transition between C-states.

FIG. 2 is a partial logic block diagram showing one embodiment of a computer system 200 that includes a processor 202 comprising one or more cores (702 and 704) configured to transition between power states, e.g. C-states using a protocol (which, in one set of embodiments, may be considered a "handshake" protocol) between a controller (718) configured on the processor, and microcode executing on the processor core (e.g., the processor core that is to transition to C6-state). Controller 718 may in general be a circuit (e.g. a "first circuit") configured on processor 202 to perform one or more functions in support of the one or more cores situated on the processor (cores 702 and 704 in the embodiment shown in FIG. 2). This circuit itself may comprise one or more circuits configured to perform one or more functions that may together comprise the full functionality of the circuit (which may also be referred to as a controller or control circuit). As shown in FIG. 2, this circuit is an NB controller (NBC) 718, which may include a circuit (or sub-circuit) configured to perform power management control as one of the functions of the overall functionality of NB controller 718. Furthermore, in yet other embodiments, the circuit (or controller or control circuit) represented in FIG. 2 by NB controller 718 may also be implemented as a distributed circuit, in which respective portions of the distributed circuit may be configured in one ore more of the processor cores, but operating on separate power planes, that is, using a different power supply than the section or sections of the cores functionally distinct from the portion or portions of the distributed circuit. The separate power planes, or distinct/separate power supplies may thereby enable each respective portion of the distributed circuit to perform its functions even when the rest of the processor core, e.g. the respective main section or sections (e.g. general processing section or sections) of the processor core that are functionally distinct from the respective portion of the distributed circuit, is in a zero-power state. This enables embodiments that feature a distributed circuit, distributed controller or distributed control circuit performing at least some or all of the functions performed by NB controller 718 shown in FIG. 2.

In the embodiment of FIG. 2, a circuit performing at least a portion of the overall functionality of NB controller 718 is shown as a power management controller (PMC) 714, which may be configured to communicate with each core (702 and 704). More specifically, PMC 714 may be configured to handle C-state requests (i.e. power-state requests) received from core 702 and/or core 704, and interface with non-volatile memory elements, in this case ROMs, 708 and 712, respectively, to provide action requests and receive action acknowledgement to/from the microcode executing on core 702 and/or 704. Cores 702 and 704 may also comprise internal registers 706 and 710, respectively, or some other form of storage medium to hold architecture and system information. NB controller 718 may also interface with South Bridge (SB) 720, and system memory (in this embodiment, DRAM) 722. PMC 714 may also provide control over the supply voltage and operating clock of each core, and may communicate with Low-Power state monitoring and predicting (LMP) block 716 to determine whether transitioning to a requested C-state is to be performed. For example, if PMC 714 has determined that a requested C-state transition corresponds to a request to transition to a C6-state (zero-power HW state), PMC 714 may determine whether or not to perform the transition based on information received from LMP block 716.

In one set of embodiments, controller 718 (or specifically, PMC 714) may be configured to determine the target hardware (HW) C-state (power-state) a given processor core or processor is targeting, based on the power-state request made by the Operating System or high level software (SW). For multiple processors and/or cores (such as multiple cores 702 and 704 in processor 202 shown in FIG. 2), HW and or SW coordination schemes may be implemented to coordinate the transition of each one of multiple cores and/or processors to various requested power-states. Coordination may need to be performed especially when cores share a resource domain, such as a supply voltage, clock domain, or any other resource the core, or processing unit may rely on for proper operation. HW-based coordination may be applied when OS/High-Level SW decisions are not sub-optimal or are less controllable, thereby less accurately reflecting current system trends. HW-based coordination may be performed according to performance-biased or power-biased approaches, depending on previously set configuration(s) in OS/High-Level SW. SW-based coordination may be applied when it is assumed that SW (e.g. OS or any other high-level SW) generates a common power-state (C-state) request for shared domains, and/or when it is assumed that the power-state request generated by the SW is based on optimal decisions, which, however, may not always be the case depending on the OS, the various algorithms involved, and other similar factors.

Monitoring Functions

In one set of embodiments, LMP block 716 may be configured to perform one or more monitoring functions and/or algorithms for determining whether or not transition to a requested low-power state, or zero-power state (0V state) should be made, once PMC 714 has determined that a requested C-state transition corresponds to a request to transition to a C6-state. Thus, as also mentioned above, PMC 714 may be configured to convert OS/High-Level software (SW) power-state (C-state) requests into hardware (HW) power-states that correspond to specific power management actions. In addition, PMC 714 may also be configured to infer common C-states, or power-states, for shared resource domains, e.g. processors or processor cores sharing the same voltage or clock plains. It should be noted however, that while the embodiment of FIG. 2 shows controller 718 as having two main components (PM 714 and Predictor/Monitor block 716), these components are shown for the purpose of illustrating certain functionality configured in controller 718. Those skilled in the art will appreciate that the various functionalities described herein may be distributed and/or assigned in a variety of ways within controller 718 specifically, and within processor 202 in general, insofar as to enable processor 202 to function as intended, in transitioning between various power-states. In general, in addition to a C6-state, other states may possibly be designated as low-power states for which monitoring in LMP 716 may be performed. For example, in one set of embodiments C5-state and C6-state may be designated as deep C-states or low-power states for the purposes of such monitoring. In addition, alternate embodiments may implement such monitoring for all possible states (C-states) according to desired system performance and performance indicators, and the monitoring for determining whether transition to a requested target power-state should be allowed to occur may be performed for any of the available C-states, with a boundary (or "fall-through") state designated as a default, to which transitioning may always take place, even in cases when transition to all other states (C-states) may have been blocked.

Therefore, once it has been determined or inferred, for example by PMC 714, which power state the software/system has requested (it may be a request for a transition to a low-power state, such as C6-state, for example) controller 718 may prevent this transition from taking place, and in some cases may demote requested C-state transitions to corresponding transitions to another C-state. For example, a requested transition to a C6-state may be demoted to a transition to C5-state or C4-state. In a similar manner, controller 718—or more specifically, in the embodiment shown in FIG. 2, PMC 714 inside controller 718—may promote a transition to a given C-state requested by the system, to a transition to another C-state, based on the indication received from LMP 716 whether transition to a deep C-state or low-power-state should be allowed to take place. Thus, for example, a request to transition to C5-state may be promoted to a transition to C6-state. In one set of embodiments, LMP block 716 may be configured to track both history and recent state status for making a decision whether to allow a given transition to proceed as requested, indicate that the requested transition should be demoted to a transition to a higher performance, or formally, a higher power (i.e. a lower C) state, or indicate that the requested transition should be promoted to a transition to a lower performance, or formally, a deeper power (i.e. a higher C) state, possibly a zero-power (C6) state. Again, the functionality ascribed to LMP block 716 is meant to illustrate functionality associated with power-state transitions of various processors and/or processor cores, and such functionality should not be interpreted as being in any way limited to LPM block 716. Alternate embodiments of which portions of the circuit are configured to perform such functionality are possible and are contemplated. However, for ease of presentation, in the embodiments described herein, PMC 714 is configured to perform power-state inference, while LPM block 716 is configured to perform power-state demotion/promotion.

Therefore, as described above, PMC 714 may be configured to convert high-level SW power-state requests into HW power-states, and infer common power-states for shared resource domains. Concurrently, LMP 716 may be configured to perform a variety of specific tasks and/or execute/implement one or more algorithms to determine whether transition to a low-power state should proceed, and/or whether transition to a power state different than the requested power state might be preferable. In addition, controller 718 (or, more specifically LMP block 716 in some embodiments) may also be configured to offer HW support for "core parking", which specifically refers to placing some of the processing units or processing cores in a low power-state (or zero-volt state, e.g. in C5-state or C6-state).

First Monitoring Function

A first monitoring function performed by LMP block 716 may include tracking recent history in the active (C0) state. If the latest residency in the active (C0) state exceeds some threshold (or specific time period), it may be an indication of recent high level of activity on the part of the affected CPU, or on the part of one or more corresponding cores of the CPU (whichever cores reside in the active state in question). This may be in contrast to the CPU—or the one or more cores of the CPU—running idle or executing shorter tasks, and transition to a low-power state, or deep C-state, may result in a loss of application performance due to a potentially long recovery time from exiting the given low-power state or deep C-state (which may be a C6-state).

In other words, the first monitoring function may be directed to determining how active a given application is. If the CPU, or corresponding one or more cores of the CPU that are primarily responsible for executing the application remain in the active state longer than a specific time period, the extended residency in the active state may serve as an indication that the application is active, in which case transitioning to a deep C-state may be undesirable. In one set of embodiments, a counter, possibly a saturation counter, may be used to set/determine when an application may be considered idle for the purpose of making a decision about transitioning into deep C-state. In general, a C0-Residency monitor may be used to predict whether transitioning into deep C-state may result in a loss of performance, due to the relatively long time period that may be required to exit the deep C-state.

Figure 5:
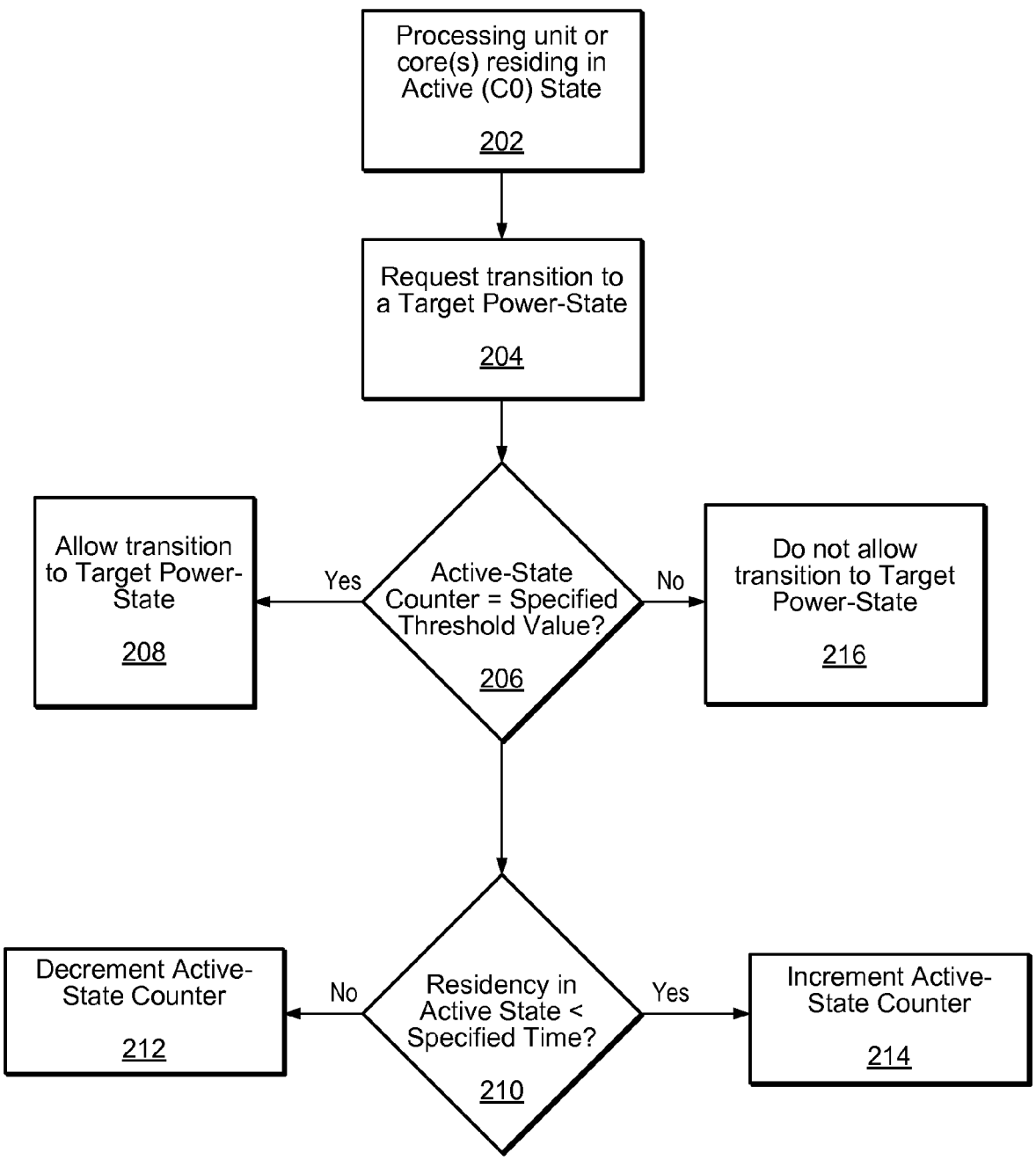
FIG. 5 is a flow diagram of one embodiment of a protocol for monitoring active-state residency of a processing unit.

FIG. 5 shows a flowchart of one embodiment of a C0-Residency, or zero-power residency monitor (monitoring function) that may be used to determine when to transition into deep C-state, or in general into the targeted power-state, without incurring a loss of performance. In one set of embodiments, the zero-power residency monitoring function may be a part of the Controller Predictors determining whether to transition to 0V-state (508) shown in the flowchart of FIG. 3. The processing unit, CPU or corresponding cores of the CPU (e.g. core 702 and/or core 704 in FIG. 2) may be in an active state (202), executing one or more applications. A request for transitioning to a target power-state may be received (204), which may be a request to transition to a zero-power state as determined in (506) in the flow diagram of the embodiment of a protocol for transitioning one or more processor cores to zero-power state shown in FIG. 3. In this case the target power-state would be a zero-power state, or C6-state. The value of an active-state counter may be checked to determine if it is equal to a specific value, which may have been specified in advance (206). When the (value of the) active-state counter is equal to the specified value, the monitoring function may indicate that the target power-state may remain as per the request, e.g. it may remain a deep C-state, such as a C6-state (208). In other words, if transition (in 204) is requested to a target power-state that is, for example, a C6-state, the monitoring function may indicate in (208) that the transition may proceed to the C6-state.

In contrast, when the (value of the) active-state counter is not equal to the specified value (i.e. it is less than the specified value, when the value of the active-state counter is allowed to saturate at the specified value), the monitoring function may indicate that a transition to the target power-state (which, in the example provided, is a C6-state) should not take place (216). The monitoring function may increment and decrement the value of the active-state counter based on how long the processing unit or cores have remained in the active state before a request for a C-state transition is received (204). Thus, the time spent in the active state may be checked (210), and if the residency time was not less than a specified time period (threshold value), the active-state counter may be decremented (212). On the other hand, if the residency time was less than a specified time period, the active-state counter may be incremented (214). In one set of embodiments, in case of (212) the active-state counter may saturate at zero, and in case of (214) it may saturate at the specified value.

Second Monitoring Function

Similar to the embodiment of the Active-State Residency flowchart shown in FIG. 5, a Non-Active-State Residency monitoring function may also be implemented and executed by LMP 716. One embodiment of a Non-Active-State Residency monitoring function is illustrated by way of the flow diagram shown in FIG. 6. The processing unit, CPU or corresponding cores of the CPU (e.g. core 702 and/or core 704 in FIG. 2) may be in an active state (302), executing one or more applications. A request for transitioning to a target power-state may be received (304), which may be a request to transition to a zero-power state as determined in (506) in the flow diagram shown in FIG. 3. In this case the target power-state may again be a zero-power state, or C6-state. The value of a non-active-state counter may be checked to determine if it is less than a first value (or specific value), which may have been specified in advance (306). When the (value of the) non-active-state counter is not less than the specified value (i.e. it is greater than or equal to the specified (first) value, where the value of the non-active-state counter may be allowed to saturate at a second value higher than the first value), the monitoring function may indicate that the target power-state may remain as per the request, e.g. it may remain a deep C-state, such as a C6-state (310) if the target power-state was a deep C-state. In other words, the monitoring function may indicate in (310) that the transition requested to the target power-state (in 304) may proceed as requested.

In contrast, when the (value of the) non-active-state counter is less than the specified value, the monitoring function may indicate that a transition to the target power-state may not take place (308). The monitoring function may increment and decrement the value of the non-active-state counter based on how long the processing unit, CPU, or corresponding cores have remained in the non-active state before a request for a C-state transition is received (304). Thus, the time spent in the non-active state may be checked (314), and if the residency time was less than a specified time period (threshold value), the non-active-state counter may be decremented (312). On the other hand, if the residency time was not less than a specified time period, the non-active-state counter may be incremented (316). In one set of embodiments, in case of (312) the active-state counter may saturate at zero, and in case of (316) it may saturate at the specified first value, or a higher, specified second value. By varying the range between the first value (threshold value) and second value (saturation value), the range of values that correspond to allowed state transitions may also be varied.

Figure 6:
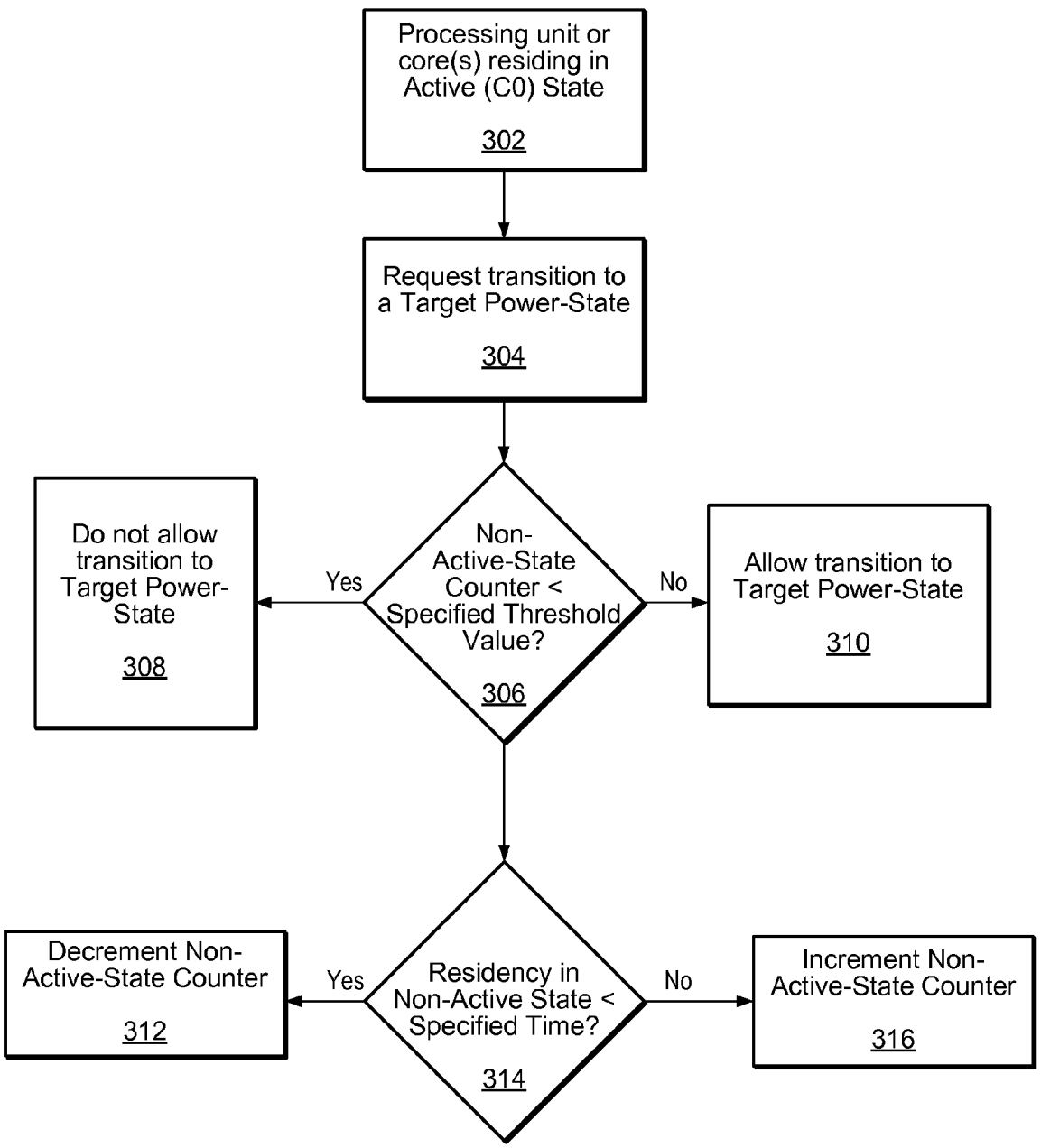
FIG. 6 is a flow diagram of one embodiment of a protocol for monitoring non-active-state residency of a processing unit.

The monitoring function exemplified in the embodiment shown in FIG. 6 may be considered as a means of predicting incoming interrupts when the system is engaged in heavy transfers (e.g. FILE transfers), as increased file transfer activity can be responsible for generating numerous interrupts. A high interrupt rate may be indicative of the processing unit, CPU or corresponding cores remaining in the non-active state for consistently short time periods. The non-active-state counter may or may not be engaged by specifying a higher saturation value than the specified threshold value that may be used for making the decision whether to allow the transition to the requested target power-state. For example, the transition to the requested target power-state may be allowed (based on the non-active-state counter) if the counter is at a specified value of 2 or higher. However, the counter's saturation value may be taken higher than 2 (e.g. 4) to ensure that accidental asynchronous interrupts are filtered out. In other words, two non-active-state saturation counter values (N and M) may be implied, where N is a positive integer and represents a minimal value enabling transition to the requested target power-state, and M is a positive integer greater than or equal to N, and represents the value at which the counter may saturate as it is being incremented.

Third Monitoring Function

A third monitoring function may track changes in a timer tick (TT) interval corresponding to an upper boundary for C-state residency. A TT interrupt may be used by the system (e.g. OS) for periodically waking-up the processing unit/CPU/cores from a low-power state for the purpose of scheduling new tasks. A TT interval may correspond to a time interval that elapses between subsequent TT interrupts (see FIG. 7), and may therefore define an upper limit for low-power state (e.g. zero-volt state) residency for a given OS. For example, the maximum time interval in Microsoft's Vista OS is 15.6 ms. In other words, the OS may automatically wake the processing unit/CPU/cores every 15.6 ms when the processing unit/CPU/cores is in a low-power state. The third monitoring function may be used for immediately capturing changes that the OS may make to the TT interval for specific applications. For example, for multi-media applications the OS may change the TT interval from 15.6 ms to a lower value of 1 ms or 2 ms. Overall, the third monitoring function may operate to determine the length of time the processing unit/CPU/core Core spends in low-power state, to infer the efficiency of the resulting power savings.

When the processing unit/CPU/cores resides in a low-power state (or deep C-state) for only a short time period, the power consumed upon entry and exit to/from the low-power state may substantially negate any potential power savings gained from the processing unit/CPU/cores transitioning and subsequently residing in the low-power state. It may therefore be desirable to cancel the transition to the low-power state in such a case. In one set of embodiments, the controller, e.g. NB Controller 718 in the system of FIG. 2, may track all OS updates of the TT Interval and store the latest TT value. The controller may also track the TT Interrupt itself, and keep track of the actual time left before a next TT interrupt, to determine whether a requested transition to a low-power state should take place.

FIG. 7 shows a timing diagram 400 of one embodiment illustrating the criteria used by the third monitoring function to determine, based on the latest TT interval value stored by the controller (e.g. NB controller 718), whether the requested transition to the target power-state, in this case a low-power state (e.g. C6-state), should be allowed to take place. As shown in FIG. 7, the TT interval may be captured by tracking two subsequent TT interrupts, and may be stored by the controller. The controller may then determine, based on when the request for transitioning to a target power-state is received and when the next TT interval is expected, how long the processing unit/CPU/core would reside in the non-active-state. The "Time to C-state request" in FIG. 7 indicates the time period elapsed between a most recent TT interrupt and when the request for transition to the target power-state is received. If the difference between the TT interval and "Time to C-state request" is greater than a specified power saving threshold (time period) value, then the requested transition to the target power-state, in this case to a low-power state (e.g.

C6-state) may be allowed to proceed. Otherwise the requested transition may be prevented, as per the third monitoring function.

Fourth Monitoring Function

In general, the fourth monitoring function may operate as a predictor of impending interrupts (other than the TT interrupts) that may break the deep C-state residency, or residency in a low-power state. For example, if a DMA transfer is in progress, there may be a chance of a corresponding interrupt being issued once the DMA transfer has completed, and such an interrupt may break a low-power state residency. It may therefore be desirable to wait until the DMA transfer has completed to make a decision whether or not to allow a requested transition to deep C-state (low-power state, or a target power-state) to take place. Thus, in one set of embodiments, the interrupts tracked and/or predicted by the fourth monitoring function may correspond to DMA transfers/processes and/or I/O processes. The fourth monitoring function may be configured to track DMA processes to determine whether a corresponding interrupt is expected at the end of the DMA process. In other words, since a DMA transfer may or may not end with a corresponding interrupt, the fourth monitoring function may be configured to track the DMA transfer and wait for a specific time period (a configurable hysteresis period) from the end of the DMA transfer. Once the specific time period expires—indicating that an End-of-DMA Interrupt has not occurred—a requested transition to a Deep C-state may be allowed from the standpoint of this event.

I/O processes may similarly be monitored to predict impending interrupts based on permission received from the I/O domain. In many systems, a hub comprising and/or interfacing with most I/O devices—such as a South Bridge (SB), for example—may be better suited than any other system component to indicate whether or not an interrupt is expected based on I/O activity. For example, an SB may be tracking the operation of USB (Universal Serial Bus) or GBE (Gigabit Ethernet) devices, and may (broadly) be overseeing the I/O domain in general. Therefore, in one set of embodiments, a protocol may be implemented to receive information from the SB to indicate whether or not a requested transition to a target power-state (e.g. low-power state) should be allowed to occur, from the standpoint of certain I/O devices. When no interrupts are expected based on I/O activity, requested transitions to specific target states, e.g. low-power states, may be allowed to occur from the standpoint of the monitored I/O devices.

For example, in a system such as system 200 in FIG. 2, controller 718 may determine that a transition to a target power-state, which may be a low-power state, has been requested. SB 720 may track its internal structures to determine whether to indicate to controller 718 that a requested transition to the low-power state should be allowed or denied. In one set of embodiments, SB 720 may transmit a packet to controller 718, with an indication of "go" (requested transition allowed) or "no go" (requested transition denied). In case of a "no go" indication from SB 720, the processing unit/processor/affected cores may remain in a non-active state, awaiting a pending change of status received from SB 720. For example, should one or more devices get unplugged from the system, SB 720 may subsequently transmit a "go" packet to indicate that the requested transition is cleared. Similarly, SB 720 may also indicate that the requested transition is cleared some time period following the request and the initial indication, even if no devices are unplugged. It may also be conceivable that following a transition to a low-power state, SB 720 may transmit a "no go" packet due to new I/O events/configuration.

As illustrated in diagram 420 in FIG. 8, the fourth monitoring function may indicate that a requested transition to the target power-state, e.g. deep C-state such as C6-state, may take place if no interrupt is received within the specified time period designated as "No end-of-DMA Interrupt Window". A subsequent interrupt may then wake up the processing unit/CPU/cores and cause an exit from the deep C-state. Similarly, as shown in diagram 422 of FIG. 8, while in a non-active state, the controller (e.g. NB Controller 718) may send a request [packet] to I/O (e.g. SB) indicating that a transition to a low-power state has been requested. The SB may respond with either a "go" or "no go" condition [packet], indicating whether to allow the requested transition to the low power-state to take place. In case a "no go" response is received by the controller, the SB may subsequently transmit a go condition, once a specified time period has elapsed without an interrupt. Once in the deep C-state, an interrupt may wake up the processing unit/CPU/cores and cause an exit from the deep C-state, similarly to the conditions shown in diagram 420.

Thread Rescheduling for Core Parking

As previously mentioned, controller 718 (or, more specifically LMP block 716 in some embodiments) may be configured to offer HW support for placing some of the processing units or processing cores in a low power-state (or zero-volt state). This process may be referred to as "core parking". Which power-states are considered for core parking may be specified according to the needs and/or requirements of a given system, and may include but are not limited to, for example, C5-state and C6-state. Core parking may facilitate reaching maximal benefits of a low-power state, or zero-volt power-state (0V C-state), by placing a processing unit or processor core in a parked state for an interval significantly exceeding the timer-tick interval. Thus, the OS may place some of the processing units and/or cores in a specified low power-state (or zero-volt state), and schedule tasks on the remaining processing units and/or cores. However, current OS scheduler designs rely on a timer-tick interrupt that wakes-up all processing units and/or cores, to enable scheduling the execution of the pending threads. In one set of embodiments, a HW structure and mechanism may be implemented to allow SW (running on a system comprising system 200 shown in FIG. 2, for example) to place processing units or processor cores in a parked state for an interval significantly exceeding the timer-tick interval. An OS scheduler (as part of the SW running on the system) may be configured to maintain a basic "parking" table, indicating which processing units/cores are in a parked state.

In one embodiment, a parking table may have a number of entries corresponding to the number of processing units and/or cores available for executing instructions. For example, in case of multi-core architecture (such as processor 202 shown in FIG. 2), the OS may have at its disposal a number of processing units and/or processing cores (or CPUs/CPU cores). If a specific processing unit/core is parked, i.e. placed in a zero-volt state (or low-power state), the entry corresponding to the specific processing unit/core may be updated to indicate that the specific processing unit/core is parked. Table 900 in FIG. 9 shows one embodiment of a simple parking table for supporting a quad-core architecture, showing a status of Core0 and Core1 being parked in a zero-volt (or low-power) state. Table 902 in FIG. 10 shows one embodiment of a more complex parking table incorporating added tracking functionality. In one set of embodiments, parking tables 900 and 902 (and parking tables in general) may be maintained, for example, by controller 718 (shown in FIG. 2) to track which processing cores (or processing units, e.g. cores 702 and 704 in FIG. 2) are in a parked state, as well as how long a given core or processing unit has been in a parked state. However, in various alternative embodiments, parking tables 900 and/or 902 may be stored anywhere in the system where they may be accessed by the OS or any high-level application, or any location in general where a scheduler responsible for managing parking of the processing units/cores may access the tables. One example of such a scheduler is further described below. While table 902 is set up to track four cores (Cores 0-3), alternate embodiments may feature tables configured to track more or less than four cores, as required by the given system arrangement.

In one set of embodiments, an inter-processor interrupt mechanism (IPIM) may be used by the controlling SW, for example the OS, to wake-up any of the parked cores, or processing units. Once a parked core has been awakened, the controlling SW may begin scheduling new tasks. One indicator for each given core in the parking table may provide information of the power-state in which the given core (or processing unit) currently resides. The controller (or control HW) may determine what the optimal power-state (C-state) for the given core or processing unit should be, based on a number of monitors and predictors. Relative depth of the power state may be determined by the number of bits used for encoding power-states. In other words, the number of bits used for encoding power-states may determine the number of possible power-states. If there are two cores or processing units in a parked state, and only one of those cores or processing units needs to be awakened, the control SW (e.g. OS, or any other high-level application) may operate to awaken the core that is parked in a less deep power-state. For example, a core or processing unit parked in a C5-state may be awakened before a core or processing unit parked in a C6-state. One example of a power-state depth column is shown in table 902, with the column representing the power-state in which a given core resides. In the example shown, the power-state is encoded using 7 bits. Examples of power-states shown are active state (e.g. C0) for cores 0 and 2, C5-state for core 1, and C6-state for core 3. As previously mentioned, table 902 (and similar tables) may be adapted for tracking a higher or lower number of cores, and may track any number of specific power-states.

As also shown in FIG. 10, another column in table 902 may be configured to indicate the length of time a given core or processing unit has been parked in a given low power-state, or more broadly, a designated "idle state". The column labeled "Idle Residency" may thereby include tracking information corresponding to the overall time the core or processing unit is parked in the given low power-state or idle state, indicated in specified units, in this case units of 1 μsec. In one set of embodiments, time spent in a parked (or idle) state may be expressed as a 32-bit entry in parking table 902. For example, the Idle Residency of core 0 may be 0 μsec, indicating that core 0 is not parked, as it is indicated to reside in an active state. In general, a time of 0 in the Idle Residency column of a given core may be indicative of the given core not being parked, or in other words, not residing in a designated idle state. It should be noted that which power-states are considered "idle states" (or "parked states") may be specified according to various system requirements, and while in one set of embodiments only a C6-state may be designated as an idle low-power state (or parked state), in other embodiments another state or states, for example a C5-state, may also be designated as an idle low-power state. In other words, any number of existing or specified power-states may be designated as idle states considered as "parking states". Thus, the Idle Residency entry of core 3 may be non-zero, indicating the time that core 3 has been parked in the power-state indicated in the Power-State Depth column (in the example shown in FIG. 10, C6-state). Similarly, by also designating C5-state as an idle state, the Idle Residency entry of core 1 may also be non-zero, indicating the time that core 1 has been parked in the power-state indicated in the Power-State Depth column (in the example shown in FIG. 10, C5-state). The Boot Strap Core column may indicate which of the cores is designated as a bootstrap core or bootstrap processor (BSP), which may always be awakened first, even if other cores are residing in parked states. In other words, the bootstrap core may be considered a designated default core that may be awakened first in case all processing units/cores are in a parked state. For example, as shown in table 902, core 1 may be designated as the processing unit or processing core that is first awakened when all processing units or processing cores are parked, as indicated by the respective Bootstrap entry for core 1 having been set to '1'.

Tracking the cores (or processing units) as exemplified in tables 900 and 902, may allow the OS, or any designated high-level application to balance the decision based on which the cores or processing units may be placed in a parking state. As previously mentioned, an inter-processor interrupt mechanism (IPIM) may be used by the high-level application to wake up any of the parked cores. Each time the IPIM or I/O (Input/Output) interrupt message wakes up a specific core/processing unit or group of cores/processing units, the parking table (e.g. table 900 or table 902) may be updated. The Power-State column for the core IDs (according to the first column) corresponding to the cores/processing units that have been awakened may be marked active (00h in the example shown in table 902). If all cores are in the idle (or parked) state, then the interrupt message may be directed to the bootstrap core (BSP) by the controller (e.g. controller 718 in FIG. 2), or by a HW unit (which may be a standalone HW scheduler) configured to schedule tasks on the processing units. In the example shown in table 902, core 1 is marked as BSP, thus it may be the core that is awakened as a result of the IPIM or I/O interrupt message, when all cores are in a parked state. In one set of embodiments, the OS or any high-level SW may decide to change the default BSP so that the first core or processing unit awakened by the I/O Interrupt is a core or processing unit specified by the OS or the high-level SW. The OS, or designated SW may be configured to update the BSP bit of the structure to specify any one of the available cores as the BSP. For example, the OS (or designated SW) may set up the corresponding bit in the Boot Strap Core column for the core or processing unit specified as the BSP, prior to placing any or all cores or processing units in a parked state. Therefore, the OS (or designated SW) may specify core 2 as the BSP by setting the corresponding bit to '1', and set the respective corresponding bits of all other cores to '0', in the Boot Strap Core column of table 902.

Figure 11:
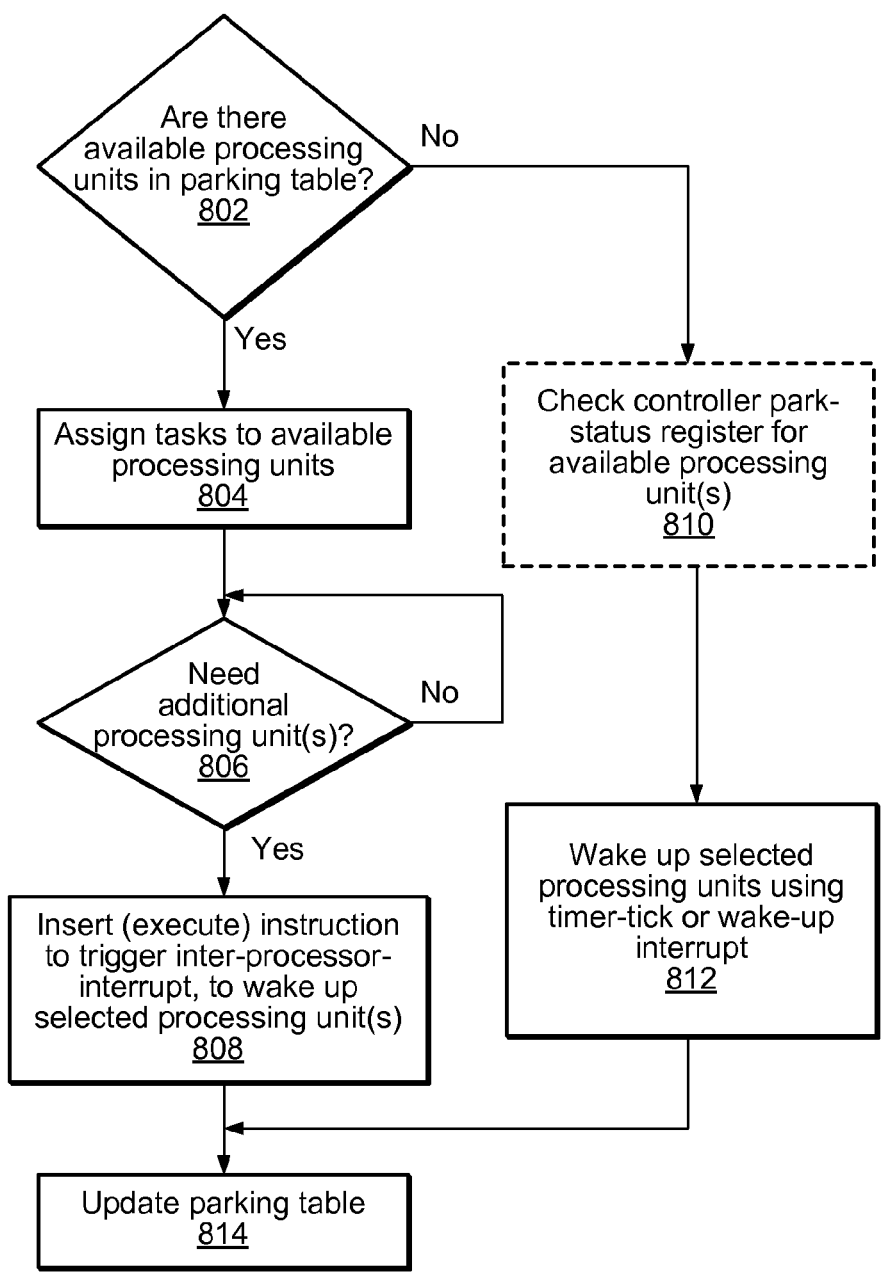
FIG. 11 shows a flow diagram of one embodiment of a scheduler for parking processing units.

FIG. 11 shows a flow diagram of a scheduler for parking processing cores and/or processing units according to one embodiment. In other words, the scheduler may be configured to track and manage (extended) idle-state residency of the processing units/cores/ In one set of embodiments, the flow diagram shown in FIG. 11 may be implemented using parking table 900 and a park-status register, which may be configured in controller 718 (and in some embodiments, in LPM 716 more specifically), shown in FIG. 2. In another set of embodiments, the flow diagram shown in FIG. 11 may be implemented using parking table 902, in which case the presence of the Bootstrap Core column, together with the column indicating idle state may obviate the need for a park-status register. The scheduler may be part of the OS, or any designated high-level application (SW), or it may be a dedicated HW unit configured to schedule tasks on the processing units/cores. As previously mentioned, in some embodiments, a HW scheduler may be a standalone unit, configured in the system. In other embodiments, a HW scheduler may be configured as part of already existing HW blocks, for example controller 718 in the system shown in FIG. 2. In general, the scheduler may be implemented in HW or SW or as a combination of both, and configured according to what may provide a most efficient mode of operation.

As part of its operation, the scheduler may check for availability of resources in the parking table, for executing impending instructions/thread (802). In case a simple parking table, such as table 900 for example, is used, if no resources (cores or processing units) are available according to the parking table, the scheduler may check a park-status register in the controller to find available resources (810), wake up selected processing units (from available resources) using timer-tick interval or wake-up interrupt (812), and update the parking table accordingly (814). The park-status register may be needed to indicate which processing units or cores are in a parked state, in case all cores/processing units have been placed in a parked state, and the controller wakes up only one of the cores/processing units on a timer-tick interrupt, while leaving other cores/processing units parked. For example, the controller may be configured to wake-up a default core/processing unit (e.g. core 0) on the next timer-tick event, if all cores/processing units have previously been transitioned to a low-power/zero-volt (parked) state, and the scheduler marked all cores/processing units as "parked", the parking table. In case an expanded parking table, such as table 902 for example, is used, no park-status register may be required, as the park-status indication of parking table 900 may be converted into the Idle Residency indication shown in table 902. Because table 902 may also include a BSP column, and that column may be used to indicate which processing unit/core may be woken up first, the status register would not longer be required. Thus, in this case the scheduler may proceed (in step 812) to wake up the processing unit/core designated as the BSP in the BSP column of parking table 902 (in the example shown, Core #1).

If the parking table indicates that resources are presently available, i.e. there are cores/processing units that are not parked (802), it may start scheduling execution of impending threads on the available (non-parked) cores and/or processing units (804). In the example shown in parking table 902, Core #0 and Core #2 are indicated as being active, and therefore available for executing impending threads. In case the scheduler identifies an upcoming performance problem due to increased demand for parallelism of the executed task (806), it may insert a designated instruction to trigger an inter-processor interrupt (IPI) in the instruction stream executing on the available cores (808). The ID of the parked cores/processing units to be awakened may also be specified as part of the IPI (808). The IPI may result in an updating of the parking table (814), indicating that one or more of the previously parked cores/processing units are now available for executing tasks.

It should also be noted that based on different requirements, in some embodiments, the operating system may be configured to never park all processing units/cores configured in the system. In other embodiments, the operating system (OS) and scheduler may operate to park all processing units/cores when the system anticipates it does not need to execute for a given period of time. Overall, an OS or any high-level SW may be configured to allow for parking all processing units/cores that are configured in the system. In systems, where the OS or high-level SW is not configured to anticipate the specific length of time for which it won't need to execute any threads, the scheduler (or commensurate SW and/or logic) may be configured to wake up a designated BSP and check the current status of SW tasks once every designated time period. In some embodiments, this wake-up task may be performed by a controller, such as power management controller 714, which is shown in FIG. 2. For example, the specified BSP may be woken up every 15 msec to check the current status of SW tasks. In one set of embodiments, the OS and/or high-level SW may be configured to allow parking all processing units/cores, and wait for some user intervention—e.g. interrupt or wake-up event—to wake-up a specified/designated BSP. Once woken up, the BSP may in turn decide to wake up other processing units/cores as necessary (for example as shown in 806 and 808 of the flow diagram in FIG. 11).

In some embodiments, the idle residency (as shown in table 902) may be used for "self-promotion", or deepening of the power-state in which the processing unit/core may reside. For example, if the idle residency of a given processing unit/core exceeds some threshold value (i.e. it exceeds a specified period of time), and the given processing unit/core is not in the deepest possible power-state, then the given processing unit/core may be transitioned into a deeper power-state, or even into the deepest power-state (e.g. C6-state in certain embodiments). This transitioning to a deeper power-state may be considered a correction to the monitor-based power-state prediction(s) described above. In other words, if the idle residency of a specific processing unit/core exceeds the time period predicted by the monitoring functions, the processing unit/core may be transitioned from its present power state to a deeper power-state.

Configuring and Combining the Monitoring Functions and Core Parking

Each of the four monitoring functions, and core parking may be enabled individually, and the monitoring functions and core parking may be configured to operate in concert with each other. In one set of embodiments, a preferred scheme for applying any one or more of the different monitoring functions and core parking may be based on system particulars, and which features are present and/or enabled within a given system. For example, by default, the first and second monitoring functions may be enabled in all systems, the third monitoring function may be enabled in systems featuring heavy multi-media traffic, and the fourth monitoring function may be disabled when the I/O configuration is configured predominantly for USB, and/or when end-of-DMA interrupts are not expected in given I/O configurations. In many systems, core parking may be enabled by default. Various other combinations are possible, and use of any one or more of the monitoring functions and core parking may be determined based on specific system and performance needs. Overall, the first and second monitoring functions may be used for ensuring system performance is not degraded as a result of a processing unit/CPU/cores transitioning into a low-power state, the third and fourth monitoring functions may be used to ensure that entry into a low-power state provides optimum or maximum power savings, and core parking may help maximize the benefit gained when transitioning in and out of low-power/zero-volt states.

Transitioning one or more of cores 702 and 704 to a zero-power state (C6-state) in system 200 will now be described according to FIG. 3, which shows a flow diagram of one embodiment of a protocol for transitioning one or more processor cores to C6-state. An operating system (OS) or high-level software program running on a processor, e.g. processor 202 of FIG. 2, may issue a command comprising a request for one or more cores, e.g. cores 702 and/or 704 of FIG. 2, to transition to a C-state, e.g. C-state x (Cx-state), where x may be a number designating a specific power state (502). The command may be recognizable by microcode executing on the processor core or processor cores, and the microcode may trap the command, and request a controller configured on the processor, e.g. NB controller 718 of FIG. 2, to transition to the given C-state (504). The microcode may then spin, awaiting a subsequent request from the controller (504).

The controller may subsequently determine to which hardware related C-state to transition. In one embodiment, the controller may convert the Cx-state request to a hardware C-state, using BIOS (or driver) configuration, for example, which may result in an indication for a transition to a zero-power (C6) state (506). The controller may determine based on certain predictors whether to transition to the requested C6-state, or to a demoted, lower C-state, i.e. a non-zero-power state (508). If the controller determines that transition to C6-state should not proceed (510), the controller may demote C6-state to a lower C-state (520). If the controller determines that transition to C6-state should proceed (510), the controller may update a register (which may be a power action register comprised within the controller) to specify in the register that a transition to C6-state is to take place, by updating the register to indicate the proper actions to be taken to facilitate and effect transition to C6-state (512). For example, the controller may update the register to indicate the next required action to be a FLUSH core to reach C6-state. After updating the register, the controller may assert an interrupt signal to indicate to the microcode that the microcode may proceed (512). In one set of embodiments, the controller may assert a STPCLK signal, which, according to prior art, is an ACPI defined Southbridge originated request for a processor or processor core to halt execution. As shown in 512, in system 200, for example, the STPCLK signal may be asserted by PMC 714 comprised in NBC 718.

The executing microcode may read the contents of the power action register, and upon recognizing the required operations that need to be performed, perform those operations, such as the FLUSH core operation, which may include flushing the processor core data (e.g. architecture and system state, cache data, etc.) into external system memory or on-die storage (514). Once the required operations (such as FLUSH core) have been performed, the microcode may update a second register (which may be a power acknowledge register configured within the controller) to indicate that the operations have been performed (514). For example, a "Done" bit may be set within the power acknowledge register. The controller may check the power acknowledge register, and upon recognizing that the required operations have been performed, may issue respective requests to gate off the operating clock of the transitioning core, and lower the transitioning core's supply voltage to the specified zero-power state level, which may be specified as 0V in some embodiments (516). Once the supply voltage has been lowered and the operating clock of the core has been uncoupled from the core, the core will reside in C6-state (518).

Figure 3:
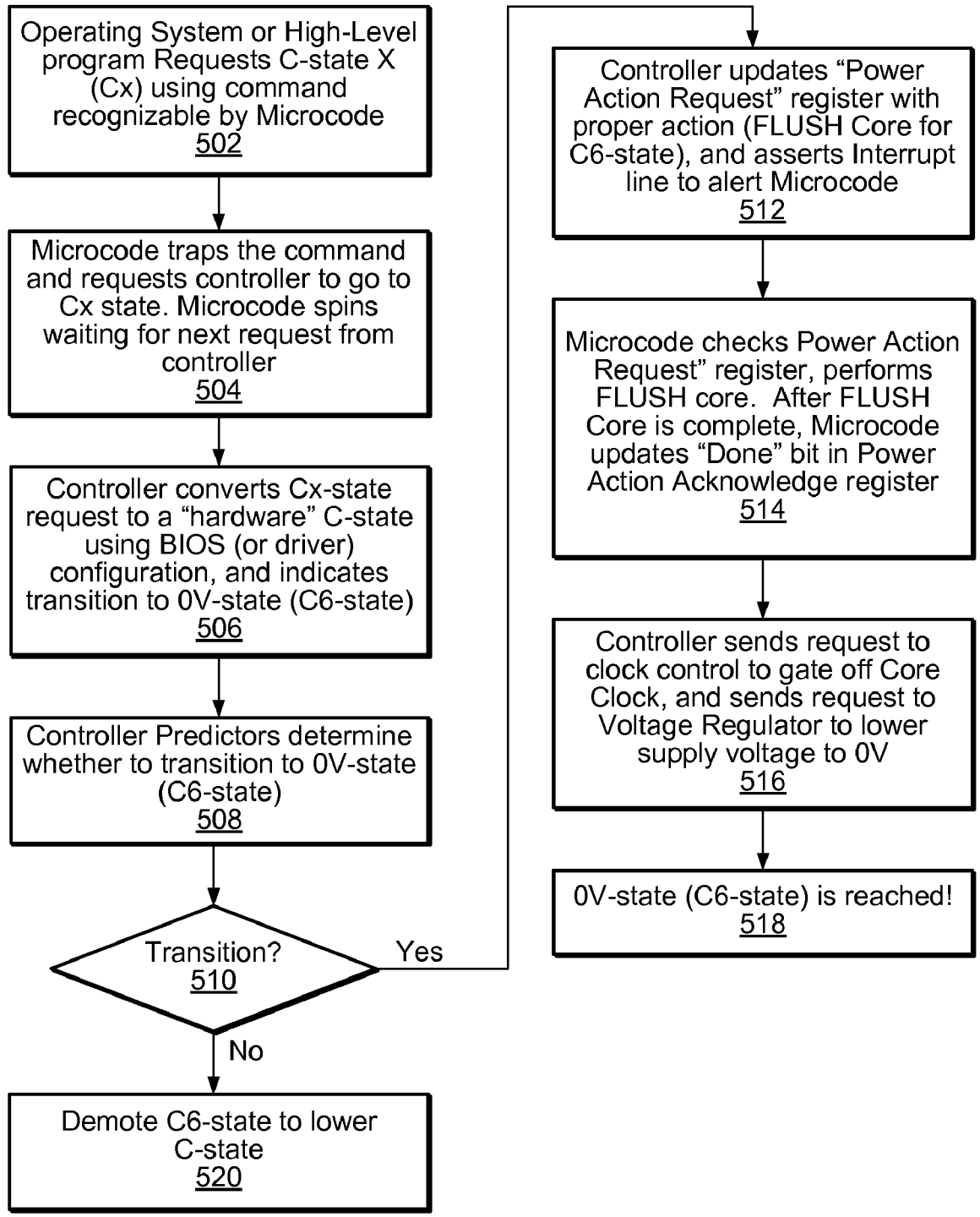
FIG. 3 is a flow diagram of one embodiment of a protocol for transitioning one or more processor cores to C6-state.
Figure 4:
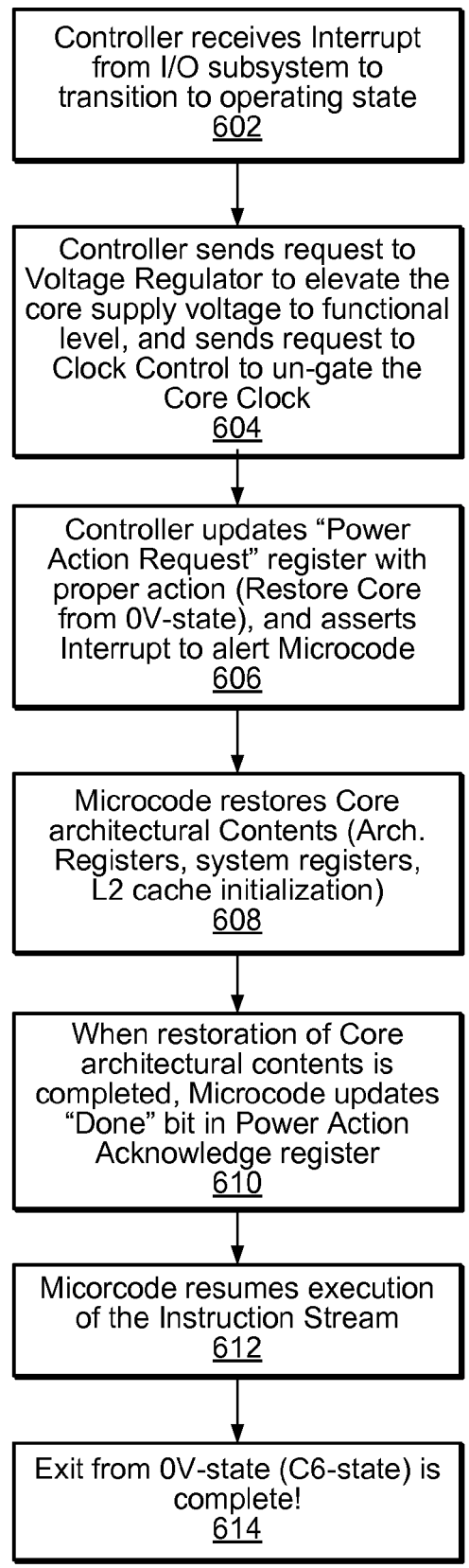
FIG. 4 is a flow diagram of one embodiment of a protocol for transitioning one or more processor cores to an operating state from C6-state.

FIG. 4 is a flow diagram of one embodiment of a protocol for transitioning one or more processor cores to an operating state from a zero-power state, e.g. from C6-state to C0-state. Similarly to the embodiment of the protocol illustrated by the flow diagram shown in FIG. 3, the protocol for transitioning from C6-state to C0-state may also apply, by way of example, to system 200 shown in FIG. 2. While the processor core (or cores) comprised in the processor is (are) in C6-state, the controller (which may be configured on the processor) may receive an interrupt signal, from an I/O subsystem, for example, to transition the processor core to an operating (e.g. C0) state (602). It should be noted that in some embodiments the interrupt signal may be received by a programmable interrupt controller (PIC) configured to handle the interrupt signal, and the PIC may be configured either inside the controller or outside the controller on the processor. Those skilled in the art will recognize that a variety of solutions for handling the interrupt signal on the processor are possible, and many of those solutions may be implemented to fit the protocol described herein. In response to the request, the controller (again, the controller may be a NB controller) may initiate re-activating the core, or cores, that were requested to transition back into an operating state. Accordingly, the controller may send out a request to a voltage regulator responsible for regulating the supply voltage of the core, to elevate the core supply voltage to a functional level (604). The controller may also send a request to a clock-control circuit responsible for providing an operating clock to the core, to un-gate, i.e. to re-couple the operating clock to the core (604). The controller may then update the power action request register to indicate what operations are to be performed for bringing the core back to an operational state, and may subsequently assert an interrupt signal to activate the microcode executable by the core (606). In one set of embodiments, the interrupt signal may be a STARTCLK signal, which may operate to activate a non-volatile storage element configured on the core to store at least an essential portion of the microcode needed by the core to start and continue executing the code.

The executing microcode may check the contents of the power action request register, and begin initializing the core by restoring the architectural and system contents, which may at this time be read back into the appropriate locations within the core from the storage media (external, system memory or on-die memory) where they had been stored as part of the transition into C6-state (608). This may also include initializing the processor cache system (e.g. L1, L2, L3 . . . ), and reading back (e.g. into patch RAM) any portion of the microcode that may have originally resided (e.g. in the patch RAM) outside the non-volatile storage element holding the essential portion of the microcode (608). Once the restoration of the architectural contents of the core has been completed, the microcode may update the power action acknowledge register to indicate that the core is now operational. For example, the microcode may set a "Done" bit inside power action acknowledge register (610). The microcode may then resume execution of the instruction stream on the core (612). Once execution of the instruction stream resumes, the core has completely exited C6-state into an operating (C0) state (614).

It should be noted that while FIG. 2 illustrates a single processor with two cores, the protocol—illustrated by respective embodiments in FIG. 3 and FIG. 4 for entering and exiting C6-state, respectively—may be equally applied to transition a single core or multiple cores (and more than two cores) to and from C6-state, and while some cores reside in C6-state, other cores may simultaneously remain fully functional. In addition, not each core is required to run the exact same microcode, and the controller may be configured to interact with the various different microcodes executed by the various cores. Those skilled in the art will appreciate the various different combinations and configurations in which the protocol may be applied to conduct transition to C6-state fully under the control of the controller (e.g. NB controller) that may be configured on the processor. Referencing FIG. 2, the power action request and power action acknowledge registers may be comprised in NB controller 718, in some embodiments specifically within PMC 714, or may reside in any portion of the processor, including the core, so long that they always remains powered on. In general, the various different combinations and configurations in which the protocol may be used to conduct transitioning in and out of a low-power state and/or zero-power state, e.g. C6-state, may be implemented under the control of a circuit (or "first circuit") configured on the processor to perform one or more functions in support of the one or more cores also configured on the processor. While the discussed embodiments focus on an NB controller, those skilled in the art will appreciate that alternate embodiments with a different circuit, control circuit, distributed circuit (as previously discussed) or controller (or multiple circuits) configured on the processor to execute the protocol are possible and are contemplated, and that all possible embodiments are not limited to those explicitly shown herein.

Benefits and Advantages

As previously mentioned, transitioning to C6-state provides many benefits over other low-power states (other C-state). One benefit is the improved power savings and battery life increase in mobile and server domains, due to the lowering of the static power component to 0W. In the mobile domain, this may prove relevant for both thin & light and ultra-portable. C6-state also enables aggressive performance improvements in processor process technology and transistor geometry, which may otherwise have to be traded-off versus static power consumption. Accordingly, various embodiments of the protocol as detailed within the following claims may provide a flexible mechanism which may be controlled by the OS and/or HW, for placing one or several cores of a processor (e.g. CPU) in a power down state, or zero-power state, while keeping all other system parts, including other processor cores, chipset, I/O, and DRAM in a fully operational state. This provides a key benefit over system sleep states (e.g. S3-S5) in which all system components are powered down and execution is completely halted. It should also be noted that in accordance with the descriptions of the various embodiments disclosed above, in many embodiments (not shown), the processing units may correspond to a variety of system components, logic blocks, circuits, and/or circuit elements that may all similarly be transitioned to the various power-states as per the principles set forth herein.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

We claim:

1. A method for scheduling tasks to execute on a plurality of processing units, the method comprising:
   determining whether any of the plurality of processing units are available for executing scheduled tasks;
   in response to determining that at least one of the plurality of processing units is available for executing the scheduled tasks, assigning the scheduled tasks to execute on the at least one of the plurality of processing units;
   determining whether additional processing units are required for executing the scheduled tasks;
   in response to determining that additional processing units are required for executing the scheduled tasks, executing an instruction to trigger an inter-processor interrupt;
   in response to the inter-processor interrupt, waking up selected one or more of remaining ones of the plurality of processing units; and
   assigning the scheduled tasks to also execute on the selected one or more of the remaining ones of the plurality of processing units.

2. The method of claim 1, wherein said waking up comprises updating a table to indicate that the one or more of the remaining ones of the plurality of processing units are available for executing the scheduled tasks.

3. The method of claim 1, wherein said determining comprises performing a lookup of a table, wherein the table comprises entries indicative of which of the plurality of processing units are available for executing the scheduled tasks.

4. The method of claim 1, further comprising:
   in response to determining that none of the plurality of processing units are available for executing the scheduled tasks, waking up a specified one of the plurality of processing units marked as a default processing unit.

5. The method of claim 4, further comprising the default processing unit determining whether any additional ones of the plurality of processing units are required, and in response to determining that additional ones of the plurality of processing units are required, waking up one or more additional ones of the plurality of processing units.

6. A system comprising:
   a plurality of processing units configured to execute computer instructions; and
   a memory element configured to store a table comprising:
      a respective first entry for each respective processing unit of at least a subset of the plurality of processing units, wherein the first entry is indicative of how long the respective processing unit has been residing in an idle state;
   wherein the system is configured to check the respective first entries in the table to identify which of the at least a subset of the plurality of processing units do not reside in an idle state;
   wherein the system is further configured to assign impending computer instructions to execute on one or more of the at least a subset of the plurality of processing units identified as not residing in an idle state when the respective first entries in the table are checked.

7. The system of claim 6, wherein the table further comprises one or more of:
   a respective second entry for each respective processing unit of the at least a subset of the plurality of processing units, wherein the second entry is indicative of a power-state in which the respective processing unit presently resides; or
   a respective third entry for each respective processing unit of the at least a subset of the plurality of processing units, wherein the third entry is indicative of whether the respective processing unit is a designated default (bootstrap) processing unit;
   wherein the system is configured to transition the bootstrap processing unit out of idle state first, when all of the at least a subset of the plurality of processing units are in an idle state.

8. The system of claim 7, wherein the bootstrap processing unit is configured to determine whether to transition out of idle state any other ones of the at least a subset of the plurality of processing units that presently reside in an idle state.

9. The system of claim 7, wherein in assigning the impending computer instructions to execute on the one or more of the at least a subset of the plurality of processing units identified as not residing in an idle state, the system is configured to check the respective second entries in the table and select the one or more of the at least a subset of the plurality of processing units according to the respective power-states in which the at least a subset of the plurality of processing units presently reside.

10. A system comprising:
a plurality of processing units configured to execute computer instructions; and
a scheduler configured to maintain a table for tracking and managing idle-state residency of each respective processing unit of the plurality of processing units, wherein the table comprises:
a respective first entry for each respective processing unit, wherein the first entry is indicative of how long the respective processing unit has been residing in an idle state;
a respective second entry for each respective processing unit, wherein the second entry is indicative of a power-state in which the respective processing unit presently resides; and
a respective third entry for each respective processing unit, wherein the third entry is indicative of whether the respective processing unit is a designated default (bootstrap) processing unit.

11. The system of claim 10, wherein the scheduler is further configured to:
check the table to identify which of the plurality of processing units do not presently reside in an idle state and are therefore available for executing impending instructions; and
assign at least a first portion of the impending instructions to execute on one or more processing units identified as not being in an idle state.

12. The system of claim 11, wherein the scheduler is further configured to:
check the table to identify bootstrap processing units; and
transition the bootstrap processing units out of idle state first, when none of the plurality of processing units have been identified as being available for executing the impending instructions.

13. The system of claim 11, wherein the scheduler is further configured to:
determine whether additional processing units are required for executing the impending instructions, in addition to the one or more processing units identified as not being in an idle state; and
in response to determining that additional processing units are required, insert an instruction into the at least first portion of the impending instructions to trigger an inter-processor interrupt to transition selected processing units identified as being in an idle state, out of idle state.

14. The system of claim 13, wherein the scheduler is further configured to:
update the respective first and second entries for the selected processing units to reflect that the selected processing units are no longer in an idle state, and to indicate a respective present power-state of each of the selected processing units.

15. The system of claim 10, wherein the scheduler is comprised in one or more of:
an operating system executing on the system;
a high-level software program executing on the system;
a dedicated hardware module; or
one or more system hardware components having a primary function different from the scheduler.

16. The system of claim 10, wherein the plurality of processing units are processor cores comprised in a processor.

17. A method for tracking and managing idle-state residency of each respective processing unit of a plurality of processing units, the method comprising:
maintaining a respective record for each respective processing unit, wherein each respective record comprises:
first information indicative of a present power-state in which the respective processing unit resides;
second information indicative of whether the respective processing unit resides in an idle state; and
third information indicative of whether the respective processing unit is specified as a default (bootstrap) processing unit;
selecting one or more processing units of the plurality of processing units according to the respective records; and
assigning impending instructions to execute on the selected one or more processing units.

18. The method of claim 17, wherein said selecting comprises:
checking the second information in the respective records to determine whether any of the plurality of processing units are not residing in an idle-state, and are therefore available to execute the impeding instructions;
selecting the one or more processing units from processing units determined as not residing in an idle state.

19. The method of claim 18, further comprising:
determining whether additional processing units in addition to the selected one or more processing units are required for executing the impending instructions;
in response to said determining indicating that additional processing units are required, inserting an instruction into already executing impending instructions to trigger an inter-processor interrupt;
in response to the inter-processor interrupt, transitioning one or more processing units presently residing in an idle state out of idle-state; and
assigning at least a portion of the impending instructions to execute on the one or more processing units transitioned out of idle state.

20. The method of claim 19, further comprising updating the respective records to reflect a present power-state and idle-state residency of the plurality of processing units.

* * * * *